(12) United States Patent
Yamasaki (10) Patent No.: US 10,411,552 B2
(45) Date of Patent: Sep. 10, 2019

(54) DRIVE DEVICE

(71) Applicant: DENSO CORPORATION, Kariya, Aichi-pref. (JP)

(72) Inventor: Masashi Yamasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 728 days.

(21) Appl. No.: 14/971,332

(22) Filed: Dec. 16, 2015

(65) Prior Publication Data

US 2016/0181885 A1    Jun. 23, 2016

(30) Foreign Application Priority Data

Dec. 22, 2014  (JP) ................................ 2014-258912

(51) Int. Cl.
| | |
|---|---|
| *H02K 5/22* | (2006.01) |
| *H02K 11/33* | (2016.01) |
| *H02K 5/10* | (2006.01) |
| *B62D 5/04* | (2006.01) |
| *H02K 3/28* | (2006.01) |
| *H02K 11/215* | (2016.01) |

(52) U.S. Cl.
CPC .......... *H02K 5/225* (2013.01); *B62D 5/0403* (2013.01); *B62D 5/046* (2013.01); *B62D 5/0421* (2013.01); *H02K 5/10* (2013.01); *H02K 11/33* (2016.01); *H02K 3/28* (2013.01); *H02K 11/215* (2016.01); *H02K 2203/03* (2013.01)

(58) Field of Classification Search
CPC .... B62D 5/046; B62D 5/0403; B62D 5/0421; H02K 11/33; H02K 5/10; H02K 5/225; H02K 11/215; H02K 3/28; H02K 2203/03

See application file for complete search history.

(56) References Cited

U.S. PATENT DOCUMENTS

| | | | | | |
|---|---|---|---|---|---|
| 4,883,982 | A | * | 11/1989 | Forbes .................... | F04D 25/08 310/156.26 |
| 8,436,500 | B2 | * | 5/2013 | Minato ................. | H02M 7/003 310/68 C |
| 9,351,432 | B2 | * | 5/2016 | Tsuboi ............... | H05K 7/20854 |
| 9,457,835 | B2 | * | 10/2016 | Yamasaki ............ | B62D 5/0406 |

(Continued)

FOREIGN PATENT DOCUMENTS

JP             5414869 B2     2/2014

OTHER PUBLICATIONS

U.S. Appl. No. 14/812,757, filed Jul. 29, 2015, Yamasaki et al.

*Primary Examiner* — Mohamad A Musleh
(74) *Attorney, Agent, or Firm* — Knobbe, Martens, Olson & Bear, LLP (57) ABSTRACT

A drive device includes a control unit with a substrate. The control unit is disposed on an opposite side of a motor relative to an output shaft of the motor. The substrate has electronic components mounted on the substrate. A motor line connects the substrate and a winding. A frame member bears the surface-mount electronic components on a first surface of the substrate. A bearing holder holds a bearing that bears a shaft. A motor line takeout part allows the motor line to extend toward the control unit. A partition wall separates the shaft and the control unit at a radial inside position of the motor line takeout part. Such a structure prevents foreign matter from intruding into a control unit accommodating space.

12 Claims, 8 Drawing Sheets

(56) References Cited

U.S. PATENT DOCUMENTS

| | | | |
|---|---|---|---|
| 9,479,025 B2 * | 10/2016 | Kawata | H02K 11/20 |
| 2008/0211357 A1 | 9/2008 | Kataoka et al. | |
| 2012/0286630 A1 * | 11/2012 | Tomizawa | H02K 5/225 310/68 D |
| 2013/0187517 A1 * | 7/2013 | Asao | H02K 1/185 310/68 D |
| 2014/0125173 A1 | 5/2014 | Hayashi | |
| 2014/0339966 A1 * | 11/2014 | Tomizawa | H02K 5/22 310/68 D |
| 2015/0319839 A1 | 11/2015 | Ichikawa et al. | |
| 2016/0036299 A1 * | 2/2016 | Hayashi | H02K 9/22 310/64 |

* cited by examiner

DRIVE DEVICE

CROSS REFERENCE TO RELATED APPLICATION

The present application is based on and claims the benefit of priority of Japanese Patent Application No. 2014-258912, filed on Dec. 22, 2014, the disclosure of which is incorporated herein by reference.

TECHNICAL FIELD

The present disclosure generally relates to a drive device and an electric power steering apparatus using such a drive device.

BACKGROUND INFORMATION

Conventionally, an electric power steering apparatus has a motor, and the motor has an output shaft on one end and a control unit on the other end of its axial direction. For example, a patent document, Japanese Patent No. 5414869 (patent document 1) discloses a motor that has a bearing holder for separating the motor (i.e., a motor body or an output-shaft side of the motor) and its control unit at a position between the motor body and the control unit.

The output shaft of the motor in the patent document 1 is disposed to pierce the bearing holder, and is exposed from a control unit side of the bearing holder. Therefore, foreign matter may intrude into the control unit through a hole that pierces the bearing holder. That is, abrasion powder, grease, and the like produced from the rotation of the motor or used in the motor may intrude into a space that houses the control unit.

SUMMARY

It is an object of the present disclosure to provide a drive device that is capable of preventing an intrusion of foreign matter into the control unit side space, and an electric power steering apparatus using such a drive device.

In an aspect of the present disclosure, a drive device has a rotating electric machine includes a case member having a cylinder part, a stator housed in the case member and having a winding wound on the stator, a rotor rotatably disposed relative to the stator, and a shaft rotatably disposed together with the rotor. The rotating electric machine also includes a control unit having a substrate on which electronic components relevant to a drive control of the rotating electric machine are mounted. A position of the control unit relative to the rotating electric machine is on an opposite side to an output part of the rotating electric machine that outputs a rotation of the rotating electric machine. The rotating electric machine further includes a connection line connecting the winding and the substrate, and a partition member that includes a bearing holder holding a bearing that rotatably bears the shaft, a connection line takeout part allowing the connection line to extend toward the control unit, and a partition wall separating the shaft and the control unit at a radial inside position relative to the connection line takeout part. The substrate is disposed on one face of the partition member that is opposite to the rotating electric machine, and the partition member and the electronic components are arranged so that heat of at least a part of the electronic components that are surface-mounted on one surface of the substrate that face the rotating electric machine is dissipated to the partition member.

According to the present disclosure, the surface-mounted electronic components disposed on the rotating electric machine facing side of the substrate, or at least a part of the components, are arranged to dissipate heat to the partition member. In other words, the partition member serves as an outer shell of the rotating electric machine, and also serves as a heat sink. In such manner, the number of components in the drive device is reduced in comparison to having a dedicated heat sink as a separate part, and the volume of the drive device is reduced especially along its axial direction.

Further, the partition wall separates (i.e., isolates) the control unit from the shaft (i.e., in a structure in which the control unit is disposed on the opposite side relative to the output side of the rotating electric machine). Therefore, the rotating components of the rotating electric machine are not exposed to the control unit, and the foreign matter such as water intruding in an inside of the case member from the output shaft side, and/or abrasion powder produced by the rotation of the rotating part, are prevented from intruding into the control unit side via an opening/gap of the bearing.

The electric power steering apparatus of the present disclosure further includes a drive device and a gear. The gear transmits a torque of the motor to a drive object. The electric power steering apparatus assists a driver's operation (i.e., steering) of a steering member by driving the drive object.

The drive device has a waterproof structure that prevents water from intruding into the control unit side via opening/gap of the bearing, even when water has intruded into an inside of the case member from the output side (e.g., from a gap between the output shaft and the bearing). Therefore, the drive device is usable in an engine room (i.e., is usable in a rack-assist type electric power steering apparatus).

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the drive device by present disclosure and the electric power steering apparatus are described based on the drawing.

First Embodiment

The drive device in the first embodiment of the present disclosure and the electric power steering apparatus are shown in FIGS. 1 to 6. Hereafter, in the following embodiments, the same or like parts have the same or like numbers, and the description of the same/like parts is not repeated.

Figure 1:
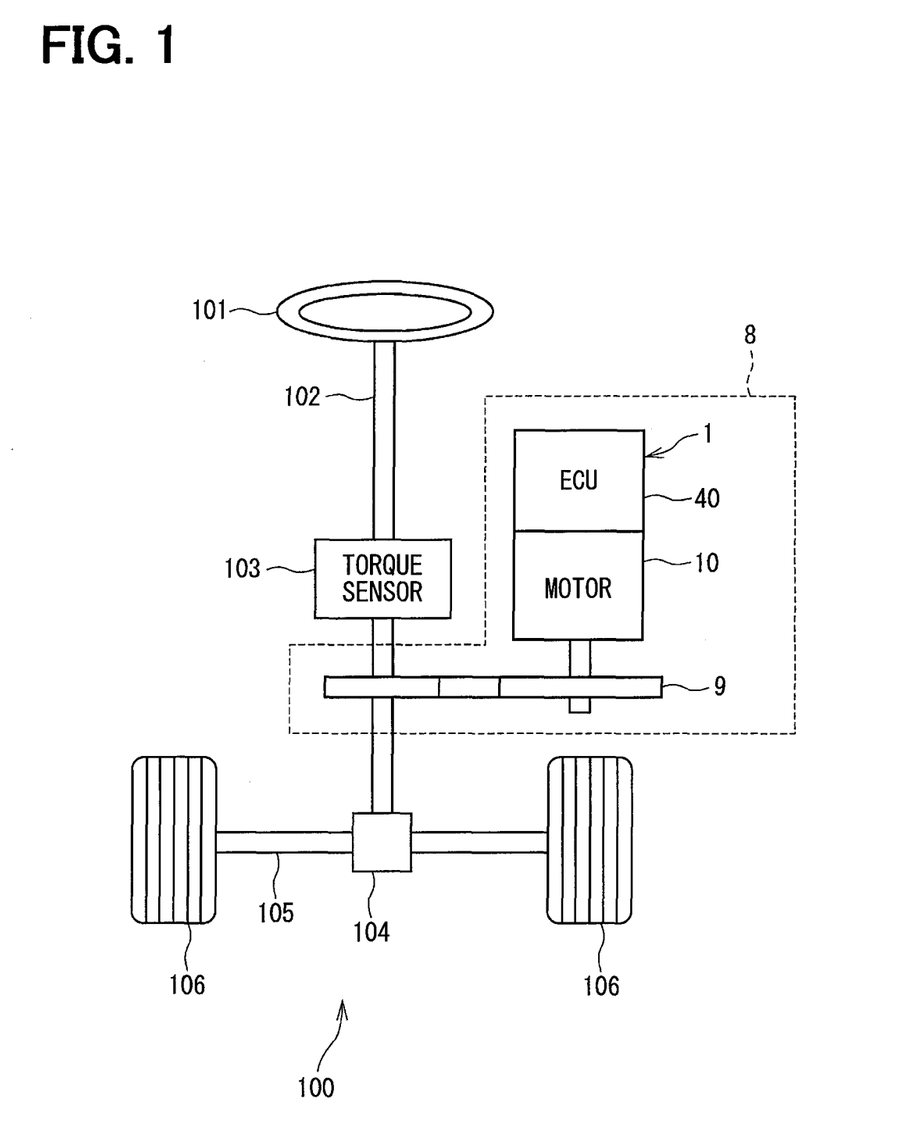
FIG. 1 is a block diagram of a power steering system in a first embodiment of the present disclosure.

As shown in FIG. 1, a drive device 1 is applied to an electric power steering apparatus 8 for assisting the steering operation by the driver. The drive device is provided as a one-body combination of a motor 10 (e.g., a rotating electric machine) and a control unit 40 (e.g., ECU), which is required for a drive control of the motor 10.

FIG. 1 shows an entire configuration of a steering system 100 provided with the electric power steering apparatus 8. The steering system 100 includes a steering wheel 101 serving as a steering member, a column shaft 102, a pinion gear 104, a rack shaft 105, a tire 106, and the electric power steering apparatus 8 or the like.

The steering wheel 101 is connected with the column shaft 102. The column shaft 102 has a torque sensor 103 that detects a steering torque inputted to the steering wheel 101 according to the driver's operation. The pinion gear 104 is disposed at the tip of the column shaft 102, and the pinion gear 104 engages with the rack shaft 105. A pair of tires 106 is disposed on both ends of the rack shaft 105 via a tie rod.

Thereby, when the driver rotates the steering wheel 101, the column shaft 102 connected with the steering wheel 101 also rotates. The rotational movement of the column shaft 102 is converted to the translational movement of the rack shaft 105 by the pinion gear 104, and the pair of tires 106 is steered by an angle according to the amount of displacement in the translational movement of the rack shaft 105.

The electric power steering apparatus 8 is provided with a speed reduction gear 9 and the drive device 1. The electric power steering apparatus 8 outputs an assist torque for assisting the operation of the steering wheel 101 assist torque based on the signals regarding the steering torque obtained from the torque sensor 103 and regarding the vehicle speed obtained from the Controller Area Network (CAN) (not illustrated), and transmits the torque to the column shaft 102 via speed reduction gear 9.

That is, the electric power steering apparatus 8 of the present embodiment provides "column-assist" that assists rotation of the column shaft 102 with the torque generated by the motor 10. However, the apparatus 8 may also be applicable to "rack assist" that assists the drive of the rack shaft 105. In other words, the column shaft 102, rack shaft 105, or the like may all be a "drive object" in the present embodiment.

Figure 2:
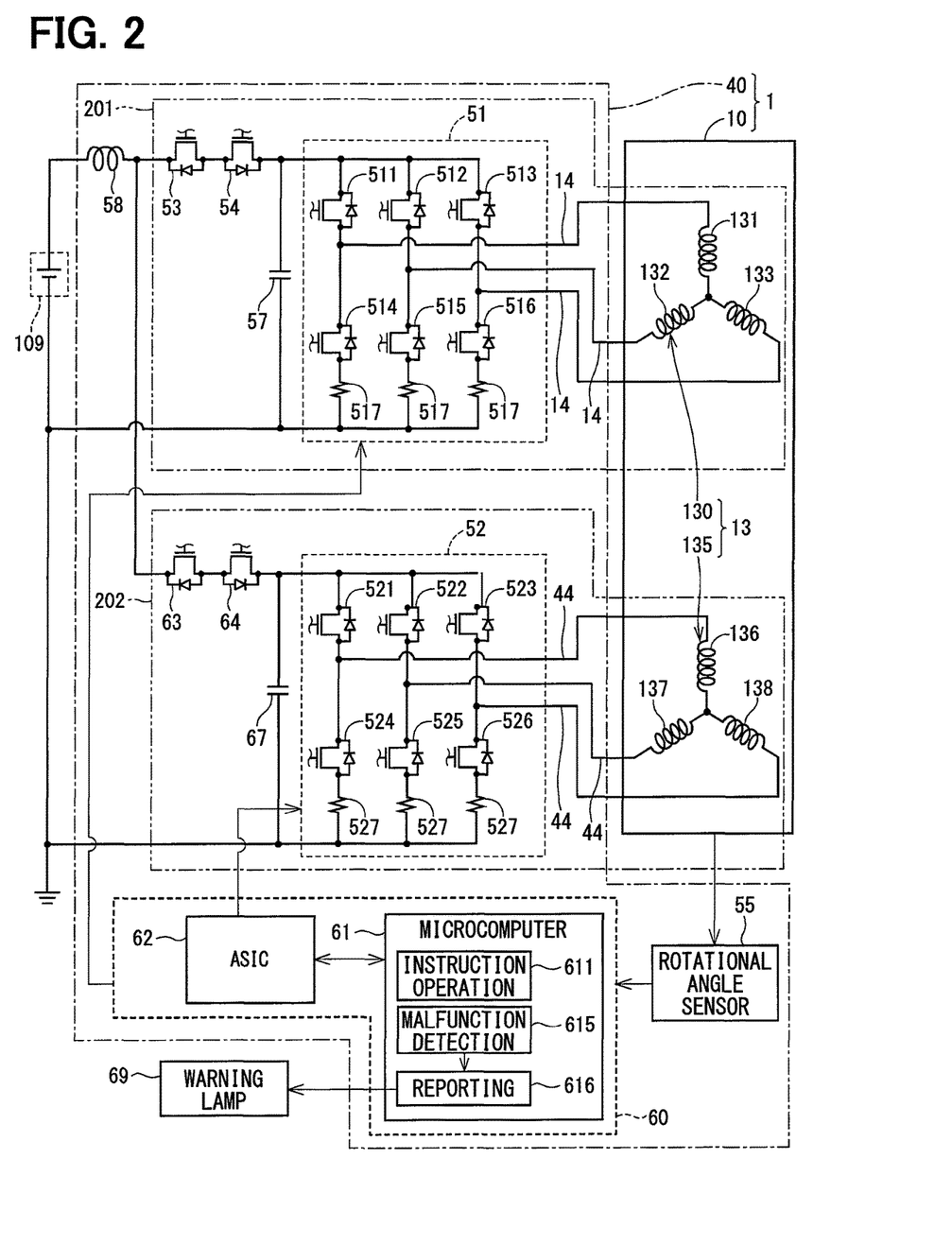
FIG. 2 is a schematic diagram of a circuit configuration of a drive device in the first embodiment of the present disclosure.

Next, the electric configuration of the electric power steering apparatus 8 is described based on FIG. 2. In FIG. 2, some control lines are omitted for avoiding confusion.

The motor 10 is a three-phase brushless motor, and has a winding 13 wound on a stator 12 mentioned later in detail. The winding 13 includes a first winding group 130 and a second winding group 135. The first winding group 130 comprises a U phase coil 131, a V phase coil 132, and a W phase coil 133. The second winding group 135 comprises a U phase coil 136, a V phase coil 137, and a W phase coil 138. A first inverter part 51 and a second inverter part 52 are connected with the winding 13 by motor lines 14, 44 as a connection line.

The following components are all mounted on a substrate 41 mentioned later (i.e., switching elements 511-516 serving as the first inverter part 51, switching elements 521-526 serving as the second inverter part 52, electric current detection elements 517, 527, power relays 53, 63, reverse connection protection relays 54, 64, a rotational angle sensor 55, capacitors 57, 67, a choke coil 58, a microcomputer 61, and an Application-Specific Integrated Circuit (ASIC) 62 serving as a control unit 60).

The switching elements 511-516 are connected to make a bridge circuit, for switching the electric current of the first winding group 130. The electric current detection element 517 detects the electric current supplied to each phase of the first winding group 130.

The switching elements 521-526 are connected to make bridge circuit, for switching the electric current of the second winding group 135. The electric current detection element 527 detects the electric current supplied to each phase of the second winding group 135.

Although the switching elements 511-516, 521-516 are Metal Oxide Semiconductor Field Effect Transistor (MOSFET), other elements such as an Insulated-Gate Bipolar Transistor (IGBT) or the like may also be used as the switching elements.

Although the electric current detection elements 517, 527 are a shunt resistor, Hall Integrated Circuit (IC) etc., may also be used as the electric current detection element.

The power relay 53 is connected at a position between the first inverter part 51 and a battery 109, and the power relay 63 is connected at a position between the second inverter part 52 and the battery 109, and both the power relays 53, 63 conduct or intercept the electric current between inverter parts 51, 52 and the battery 109.

The reverse connection protection relay 54 is connected at a position between the first inverter part 51 and the power relay 53, and the power relay 64 is connected at a position between the second inverter part 52 and the power relay 63. The reverse connection protection relays 54, 64 prevent the electric current from reversely flowing from the battery 109, which may be caused by a reverse connection of the battery 109, to the circuit, by having a parasitic diode connected in reverse to the power relays 53, 63, and protect the control unit 40.

According to the present embodiment, although the power relays 53, 63 and the reverse connection protection relays 54, 64 are all MOSFET, other elements such as an IGBT or the like may also be used.

The rotational angle sensor 55 is provided as a magnetism detecting element and detects a change of the magnetic field of a magnet 18, which rotates according to the rotation of the rotor 15. Thereby the rotational angle sensor 55 detects the rotation position of the rotor 15.

The capacitors 57, 67 are connected in parallel with the first inverter part 51 and the second inverter part 52, respectively. In the present embodiment, the capacitors 57, 67 are aluminum electrolytic condenser.

The choke coil 58 is connected at a position between the battery 109 and the positive electrodes of the capacitors 57, 67.

The capacitors 57, 67 and the choke coil 58 constitute a filter circuit, and they reduce the noise transmitted from the drive device 1 to other devices that share the battery 109, and the noise transmitted from other devices which share the battery 109 with the drive device 1.

The control unit 60 has the microcomputer 61 and the ASIC 62 or the like as an arithmetic circuit. The microcomputer 61 has an instruction operation part 611, a malfunction detection part 615, and a reporting part 616 respectively as functional blocks.

The instruction operation part 611 calculates an instruction value concerning the power supply of the first winding group 130 and the second winding group 135 based on the signal from the torque sensor 103, the rotational angle sensor 55 and the like.

The malfunction detection part 615 detects malfunction or abnormality, for example, based on a terminal voltage of coils 131-133, 141-143, etc.

The reporting part 616 reports to the driver that the abnormality is happening in the electric power steering apparatus 8, when the abnormality is detected in the malfunction detection part 615. In the present embodiment, the abnormality of the electric power steering apparatus 8 is reported to the driver by a warning lamp 69.

The ASIC 62 includes a pre-driver, a signal amplification part, a regulator, and the like. The pre-driver generates a driving signal based on an instruction value calculated by the instruction operation part 611, and outputs the generated driving signal to the first inverter part 51 and to the second inverter part 52.

In detail, the pre-driver outputs the generated driving signal to the gates of switching elements 511-516, 521-516. Then, the switching elements 511-516, 521-516 perform switching operation according to the driving signal, and an AC current according to the instruction value is supplied to the first winding group 130 and to the second winding group 135 from the first inverter part 51 and the second inverter part 52, thereby, the motor 10 is driven.

The signal amplification part amplifies the detection signal of the electric current detection elements 517 and 527 (i.e., a voltage between the two terminals thereof in the present embodiment), and the detection value of the rotational angle sensor 55, and outputs the amplified signal to the microcomputer 61.

The regulator serves as a stabilization circuit that stabilizes the voltage supplied to the microcomputer 61 and the like.

In the present embodiment, the first inverter part 51, the power relay 53, the reverse connection protection relay 54, and the capacitor 57, which correspond to the first winding group 130, is considered as a first system 201.

Further, the second inverter part 52, the power relay 63, the reverse connection protection relay 64, and the capacitor 67, which correspond to the second winding group 135 are considered as a second system 202.

That is, a drive control of the motor 10 is performed in multiple systems (i.e., in two systems in the present embodiment).

Figure 3:
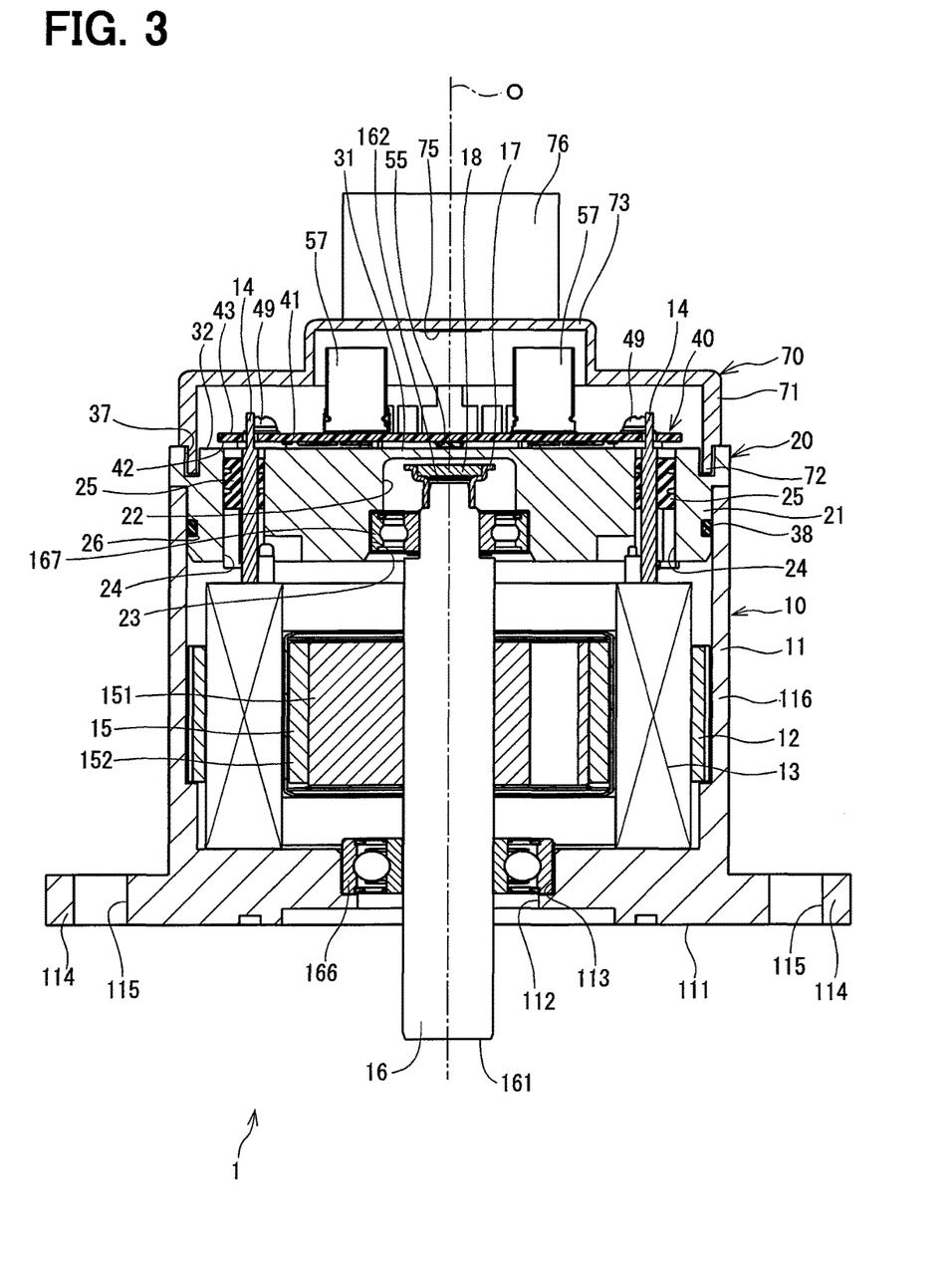
FIG. 3 is a cross-sectional view of the drive device in the first embodiment of the present disclosure.
Figure 4:
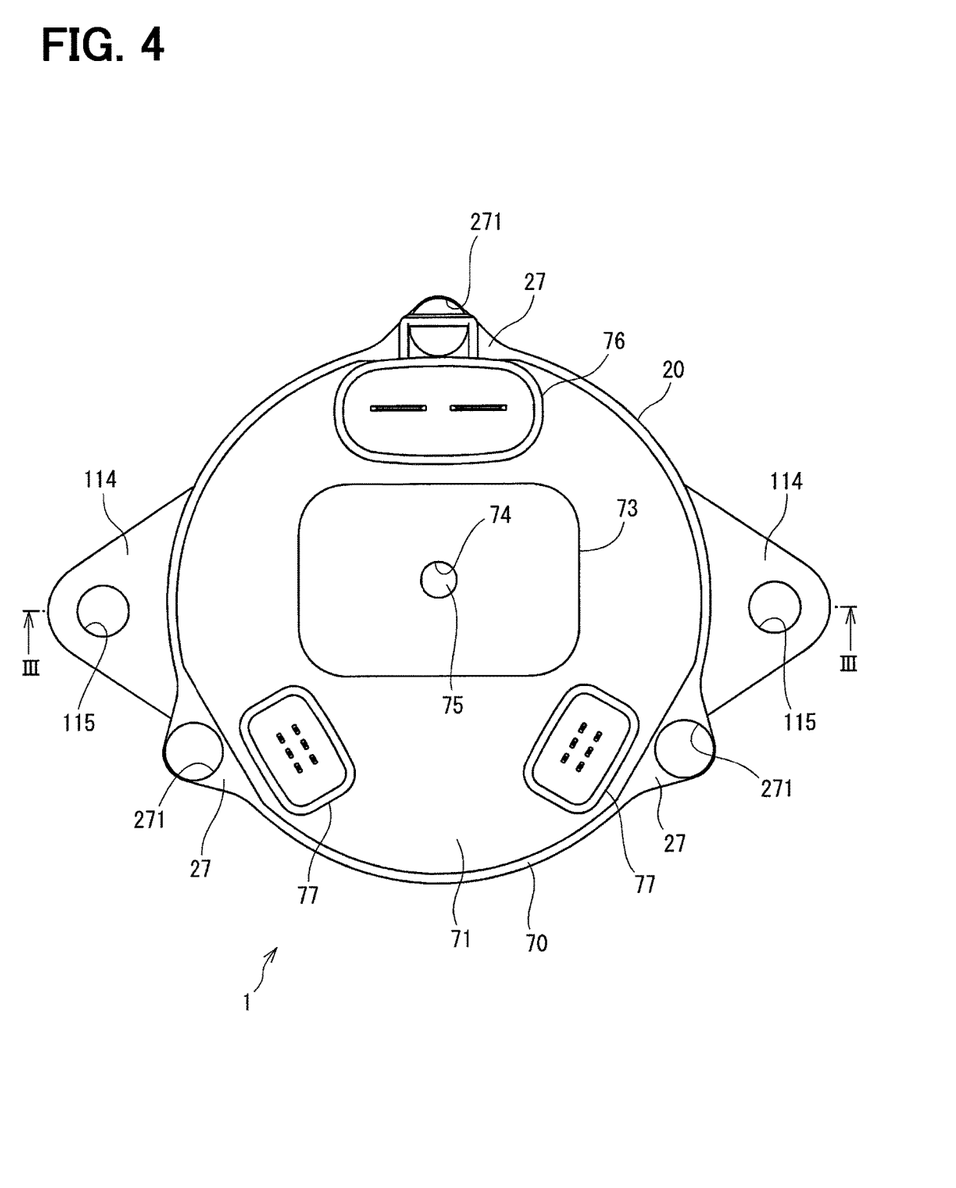
FIG. 4 is a plan view of the drive device in the first embodiment of the present disclosure.

The drive device 1 is described based on FIGS. 3-6. FIG. 3 is a cross-sectional view of FIG. 4 across the III-III line, and a frame lockscrew 39 is omitted in FIG. 4. In the following, the axial direction of the motor 10 is simply designated as an "axial direction", and the radius direction of the motor 10 is simply designated as a "radius direction".

As shown in FIGS. 3-6, the drive device 1 is provided with the motor 10, a frame member 20 as a partition member, a control unit 40, and a cover member 70 and the like.

The motor 10 is provided with, as a case member, a motor case 11, the stator 12, the winding 13, a rotor 15, and a shaft 16 and the like. The motor 10 of the present embodiment is an alternating current motor having three phases.

The motor case 11 has a bottom part 111 and a cylinder part 116, for example, and is formed substantially in a cylinder shape having a bottom that are made with metal (e.g., aluminum).

According to the present embodiment, the bottom part 111 and the control unit 40 are put on both ends in the axial direction of the drive device 1, among which the bottom part 111 closes one end of the cylinder part 116 while the control unit 40 cover an opening of the cylinder part 116 on the other end.

A shaft hole 112 is bored on the bottom part 111. The shaft hole 112 receives an output side end 161 of the shaft 16 inserted into the shaft. Further, a bearing holder 113 holding a bearing 166 is also disposed on the bottom part 111.

A fixing part 114 projects, or stands, from the bottom part 111 along a radius direction. The fixing part 114 has a fixation hole 115 bored on the fixing part 114, where fixation components (e.g., a screw thread used for fixation of the drive device 1 onto the gearbox (not illustrated)) are inserted.

A fixing part 117 for fixing the frame member 20 projects along the radius direction outwardly at a periphery of the opening of the cylinder part 116. A screw hole (not illustrated) is bored on the fixing part 117. According to the present embodiment, the fixing part 117 is made at three positions.

The stator 12 has a layered section, which is a layer of thin board that is made of magnetic material (e.g., iron), and an insulator formed on an outside along the axial direction of the layered section, and is fixed in an inside of the motor case 11.

The number of layers of the thin board used for the layered section of the stator 12 may be changed according to an output required for the motor 10. Thereby, the output of the motor 10 is changeable by changing the length of the axial direction only, (i.e., without changing the size of the radius direction).

The winding 13 is wound on the insulator of the stator 12. A total of six motor lines 14, 44 for every phase in each system are taken out from the winding 13 toward the control unit 40. The motor lines 14, 44 are taken out from the control unit 40 side of the motor case 11.

The rotor 15 has a rotor core 151 and a permanent magnet 152. The rotor core 151 has substantially a cylindrical shape, for example, is made with magnetic materials (e.g., iron), and is positioned coaxially in a radius inside of the stator 12. The permanent magnet 152 is disposed outside of the rotor core 151 in the radius direction so that an N pole and an S pole alternate.

The shaft 16 has a rod shape, for example, is metallic, and is fixed at the axial center of the rotor core 151. The shaft 16 is borne by the bearing 166 fixed to the bottom part 111 of a motor case 11, and by a bearing 167 fixed to the frame member 20 in a rotatable manner. Thereby, the shaft 16 is rotatable together with the rotor 15.

An air gap is provided at a position between an outer wall of the rotor 15, and an inner wall of the stator 12. According to the present embodiment, an extension line of the axis of the shaft 16 (i.e., a virtual line) is designated as an axis line O.

The output side end 161 of the shaft 16 is inserted into the shaft hole 112 that is bored on the bottom part 111 of the motor case 11, and the end 161 projects to an exterior of the motor case 11. The output side end 161 of the shaft 16 has an output end that is connected to the speed reduction gear 9 (refer to FIG. 1) provided in the gearbox (not illustrated). Thereby, a torque generated by rotation of the rotor 15 and the shaft 16 is outputted to the column shaft 102 via the speed reduction gear 9. Hereafter, the output side end 161 and its proximity may be designated as an "output part".

The other end of the shaft 16 (i.e., a control unit side end 162 that is close to the control unit 40) has a magnet holder 17 holding the magnet 18.

The magnet 18 is fixed on the control unit side end 162 of the shaft 16, and rotates together with the shaft 16.

Hereafter, the rotor 15, the shaft 16, the bearings 166 and 167, and the magnet 18 may be altogether designated as a "rotation part".

Figure 5:
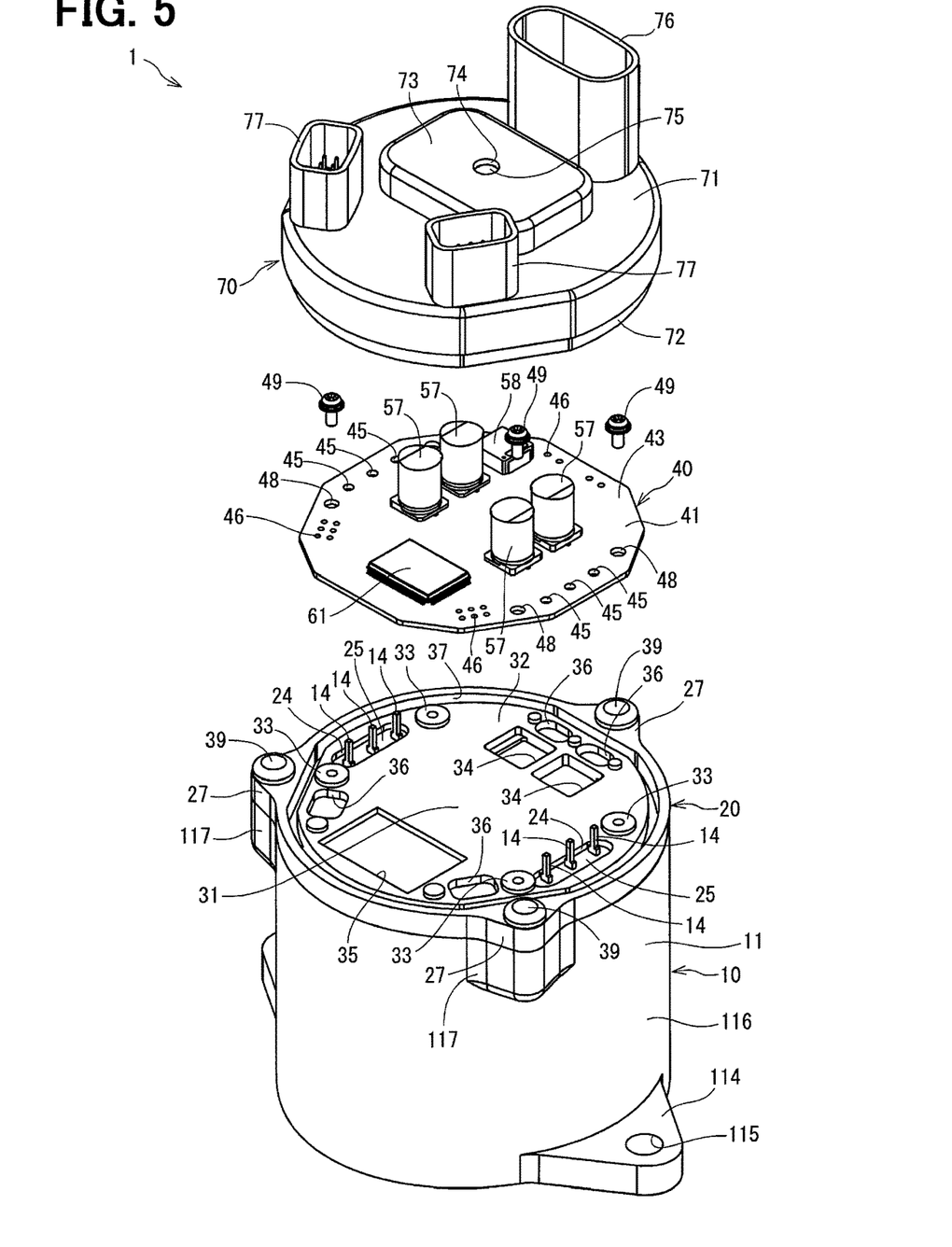
FIG. 5 is an exploded perspective view of the drive device in the first embodiment of the present disclosure.

The frame member 20 has an insert portion 21, a bearing holder 23, a motor line takeout part 24, and a partition wall 31, and has a disk shape, substantially. The frame member 20 is made with a material having good electric/heat conductivity and having non-magnetic characteristic. The frame member 20 of the present embodiment, for example, is made with aluminum.

The insert portion 21 of the frame member 20 is inserted into the cylinder part 116 so that the frame member 20 may close an opening of the motor case 11.

An insertion room 22, which has an opening toward the motor 10 side, is formed at the axial center of the frame member 20. The control unit side end 162 of the shaft 16 and the magnet 18 are inserted into the insertion room 22. The control unit 40 side wall of the insertion room 22 serves as the partition wall 31. The magnet 18 is positioned to face the control unit 40 across the partition wall 31. In other words, the partition wall 31 has no hole, slit or the like that pierces through the frame member 20 and exposes a motor side of the member 20 to a control unit side of the member. That is, the magnet 18 is not exposed to (i.e., kept enclosed from) a control unit side.

The partition wall 31 may be an area of the frame member 20 on which the magnet 18 or the bearing 167 is projected along the axial direction, for example, or may be an entire inside of the motor line takeout part 24.

The bearing holder 23 holding the bearing 167 is formed on the frame member 20.

The motor line takeout part 24 is provided on the frame member 20, to extend the connection line/wire from the motor 10. According to the present embodiment, two motor line takeout parts 24 are formed, and the motor lines 14, 44 is taken out from each of the motor line takeout parts 24 for each of the two systems. The motor line takeout part 24 has a seal member 25 made with rubber, etc. disposed on the motor line takeout part 24.

The seal member 25 seals the frame member 20, or more practically, a gap between the motor lines 14, 44 and the frame member 20. The seal member 25 has three through holes that pierce the member 25 along the axial direction, and one hole accommodates one of the motor lines 14, 44. In such manner, the motor lines 14, 44 extend to reach the control unit 40.

The seal member 25 provides seal function for sealing the takeout part 24, a positioning function for positioning the motor lines 14, 44, and an insulation function for insulating the frame member 20 from the motor lines 14, 44.

An O ring groove 26 is formed outside (e.g., an outer surface) of the insert portion 21 of the frame member 20. An O ring 38 is inserted in the O ring groove 26, and the O ring 38 is bindingly pressed by the groove 26 and the cylinder part 116. Thereby, a seal between the motor case 11 and the frame member 20 is established, and permeation of water (e.g., water drops) through a gap between the motor case 11 and the frame members 20, etc., is prevented.

A fixing part 27 projects or stands from the frame member 20 along the radius direction. The fixing part 27 is formed as a corresponding part to the fixing part 117. That is, the fixing part 27 is formed at three positions in the present embodiment. A screw hole 271 into which the frame lockscrew 39 is inserted is formed on the fixing part 27. The frame lockscrew 39 is screwed on the screw-thread hole on the fixing part 117. Thereby, the frame member 20 is fixedly attached to the motor case 11.

The frame member 20 and the motor case 11 are electrically connected with each other by a face contact between fixing parts 117 and 27. Further, by using an electrically-conductive frame lockscrew 39, an electrical connection between the frame member 20 and the motor case 11 is securely established.

On a substrate fixing face 32, a fixing part 33 is provided into which a substrate fixing lockscrew 49 for fixing the substrate 41 is screwed. The substrate fixing face 32 is one face of the frame member 20, and is on an opposite side relative to the motor 10 (i.e., the face 32 is facing away from the motor 10). The substrate fixing face 32 has a relay housing part 34, an ASIC housing part 35, and a terminal groove 36 formed on the substrate fixing face 32.

The relay housing part 34, the ASIC housing part 35, and the terminal groove 36 are formed as a concave with its bottom closed (i.e., are not piercing the frame member 20) to a motor side.

An adhesion groove 37, into which an insert portion 72 of the cover member 70 is inserted, is formed on the substrate fixing face 32 in an outside area in the radius direction relative to a position of the control unit 40.

The control unit 40 has the substrate 41 and electronic components mounted on the substrate 41, and is positioned in a motor region which is a projection of the motor case 11 along the axial direction (i.e., a region defined by a virtual cylinder shape motor case extending away from the output side of the motor 10 and falling on the substrate 41).

The substrate 41 is fixed onto the substrate fixing face 32 of the frame member 20 by the substrate fixing lockscrew 49. According to the present embodiment, a first surface 42 and a second surface 43 of the substrate 41 are respectively defined as a motor facing side of the substrate 41, and a facing-away side of the substrate 41, relative to the motor 10.

Figure 6:
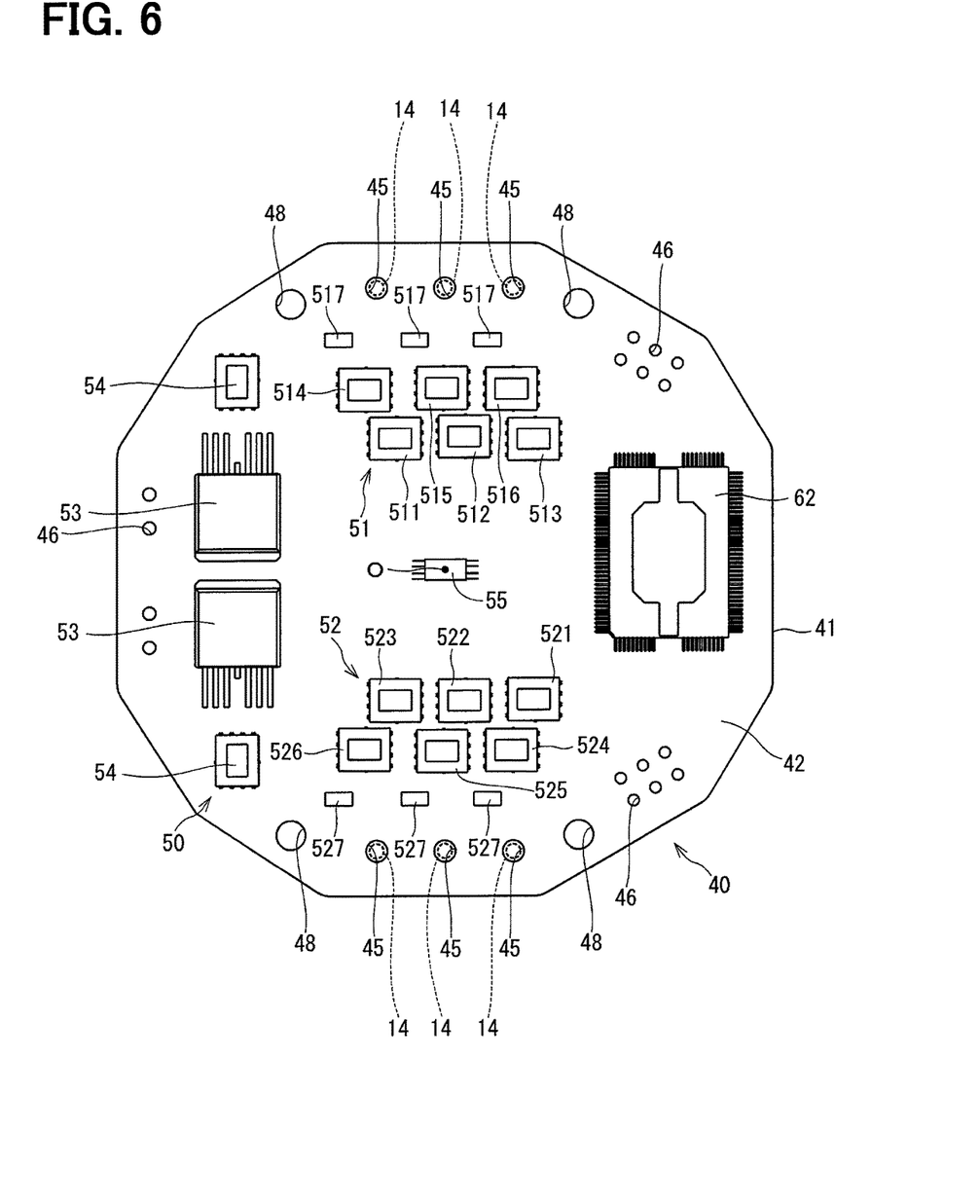
FIG. 6 is a plan view of a substrate in the first embodiment of the present disclosure.

A motor line connection part 45 by which the motor lines 14, 44 is connected to the substrate 41, and a terminal connection part 46, by which a terminal of connectors 76 and 77 mentioned later is connected to the substrate 41, are respectively provided on the substrate 41, along with a screw hole 48 into which the substrate fixing lockscrew 49 is inserted. The motor lines 14, 44 and the terminal of the connectors 76 and 77 are electrically connected to the substrate 41, for example, by the soldering, etc.

The lockscrew 49 is inserted into the screw hole 48, and is screwed to the fixing part 33 of the frame member 20. Thereby, the substrate 41 is fixed to the frame member 20.

As shown in FIG. 6, the switching element 511-516, 521-526, the electric current detection elements 517, 527, the power relays 53, 63, the reverse connection protection relays 54, 64, the rotational angle sensor 55, and the ASIC 62 are surface-mounted on the first surface 42 of the substrate 41.

According to the present embodiment, the switching elements 511-516, 521-526, the electric current detection element 517, 527, the power relays 53, 63, the reverse connection protection relays 54, 64, and the ASIC 62 are respectively designated as a "heat generation element 50". The heat generation element 50 is disposed on the frame member 20 in a heat dissipatable manner via a heat dissipation gel, etc. (not illustrated). Thereby, heat from the heat generation element 50 which is generated by the power supply, etc., is dissipated to the frame member 20.

The power relay 53 is, compared with the switching elements 511-516, and 521-526 etc., a large component, and is accommodated in the relay housing part 34 formed on the substrate fixing face 32 of the frame member 20.

The ASIC 62 is, compared with the switching elements 511-516, and 521-526 etc., a large component, and is accommodated in the ASIC housing part 35 formed on the substrate fixing face 32.

According to the present embodiment, the frame member 20 functions as an outer shell of the motor 10, as a holder for holding the control unit 40, and also as a radiator or a heat sink that dissipates heat from the heat generation element 50.

As compared with a case in which a separate component for holding the heat sink and the control unit 40 is provided, such a structure is beneficial in reducing the number of components, and in reducing the volume of the drive device 1.

The rotational angle sensor 55 is surface-mounted on the first surface 42 of the substrate 41, and faces the partition wall 31 of the frame member 20. According to the present embodiment, the sensor 55 is mounted at a position on the axis line O on the first surface 42.

Even though the rotational angle sensor 55 and the magnet 18 are interposed by the partition wall 31 in the present embodiment, the rotational angle sensor 55 is capable of detecting the magnetic field (i.e., change of the magnetic field due to the rotation of magnet 18) when the partition wall 31 of the frame member 20 is made with a non-magnetic material.

The rotational angle sensor 55 and the magnet 18 may preferably be positioned as close to the frame member 20 as possible, as long as both of the sensor 55 and the magnet 18 do not contact the frame member 20.

As shown in FIG. 5, the capacitors 57, 67, the choke coil 58, and the microcomputer 61 are mounted on the second surface 43 of the substrate 41.

According to the present embodiment, by mounting the capacitors 57, 67 and the choke coil 58, which are relatively large-sized electronic components, on the second surface 43, which faces away from the frame member 20 on the opposite side of the substrate, the substrate 41 and the frame member 20 are positioned close to each other. This allows the heat of the heat generation element 50 mounted on the first surface 42 to be dissipated to the frame member 20 from the back of the heat generation element 50.

According to the present embodiment, the switching elements 511-516, 521-526, the electric current detection elements 517, 527, the power relays 53, 63, the reverse connection protection relays 54, 64, the rotational angle sensor 55, the capacitors 57, 67 and the choke coil 58 are mounted on one substrate 41, thereby reducing the size of the drive device 1, and reducing the number of components, in comparison to the structure that uses two or more substrates.

The cover member 70 has a cover body 71, a power supply connector 76, and a signal connector 77, and covers the second surface 43 of the substrate 41.

The insert portion 72 is formed on an end of the cover body 71 close to the motor 10. The insert portion 72 is inserted into the adhesion groove 37 formed on the substrate fixing face 32 of the frame member 20, and is fixed by adhesives. Thereby, permeation of water (e.g., water drops) from a gap between the frame member 20 and the cover member 70 is prevented.

A capacitor housing part 73 is formed substantially at the center of the cover body 71. The capacitor housing part 73 projects away from the motor 10, and accommodates the capacitors 57, 67. The capacitor housing part 73 has a breathing hole 74 formed on the capacitor housing part 73.

The breathing hole 74 is closed by a filter member 75. The filter member 75 is made with a material which allows air only and does not allow water to pass through. In such manner, the change of pressure in the drive device 1 is reduced even when temperature changes.

The power supply connector 76 and the signal connector 77 project from the cover body 71 (i.e., stand on the cover body 71 to extend away from the motor 10). According to the present embodiment, the connectors 76 and 77 are formed in one body with the cover body 71. The terminal of each of the connectors 76 and 77 is inserted into the terminal connection part 46 of the substrate 41, and is electrically connected with the substrate 41.

The power supply connector 76 has an opening that opens in an upward direction, and is connectable to a non-illustrated wire harness that is connected with and extends from the battery 109 (refer to FIG. 2.) from the above (i.e., to the wire harness inserted along the axial direction from the above).

The signal connector 77 also has an opening that opens in an upward direction, and is connectable to a non-illustrated wire harness from the above.

According to the present embodiment, two signal connectors 77 are provided, one of which receives a wire harness connected with the torque sensor 103 (refer to FIG. 1), and the other of the two receives a wire harness connected with CAN.

According to the present embodiment, in the configuration in which the control unit 40 is disposed coaxially on the output end of the motor 10, which is an opposite end relative to the shaft 16, the control unit side end 162 of the shaft 16 and the control unit 40 are separated by the partition wall 31 of the frame member 20, which is disposed at such a position. In other words, the shaft 16 does not pierce through the frame member 20 (i.e., is not exposed from the control unit side of the frame member 20). Therefore, the rotation part of the motor 10 is not exposed to the control unit side of the frame member 20.

Further, the seal member 25 is provided for the motor line takeout part 24, and establishes a waterproof structure of the sealing part.

Therefore, even when water is leaking from or around the output side end 161 of the shaft 16, which may intrude into an inside of the motor case 11, the control unit 40 that is separated from the inside of the motor case 11 by the frame member 20 is free from trouble (i.e., free from an intrusion of water from the motor side). Further, the abraded power or the like that are produced by the rotation of the shaft 16, and the grease on the bearing 167 are prevented from intruding into the control unit 40.

In the present embodiment, the motor case 11 is connected to a ground via the frame member 20, the substrate 41, and a ground terminal of the power supply connector 76. Therefore, when water intrudes into the motor case 11, the electric resistance between the motor lines 14, 44 and the motor case 11 is changed. Therefore, according to the present embodiment, the malfunction detection part 615 is used to detect the terminal voltage of the winding 13, which enables a detection of the change of the resistance between the motor lines 14, 44 and the motor case 11, thereby detecting the intrusion of water into the motor case 11. In case of water intrusion into the motor case 11, the warning lamp 69 may be lighted to report the abnormality of the electric power steering apparatus 8 to the driver of the vehicle.

As described in detail above, the drive device 1 is provided with the motor 10, the control unit 40, the motor lines 14, 44, and the frame member 20.

The motor 10 has the motor case 11, the stator 12, the rotor 15, and the shaft 16. The motor case 11 has the cylinder part 116. The stator 12 has the winding 13 wound on the stator 12, and is accommodated in the motor case 11. The rotor 15 is disposed to be rotatable relative to the stator 12. The shaft 16 rotates together with the rotor 15 in one body.

The control unit 40 has the substrate 41, and is provided on an opposite side relative to the output side of the motor 10, from which the rotation of the motor 10 is output to an outside of the motor 10.

The substrate 41 has electronic components mounted on the substrate 1 (i.e., the switching elements 511-516, 621-526, the electric current detection elements 517, 527, the power relays 53, 63, the reverse connection protection relay 54, the rotational angle sensor 55, the capacitors 57, 67, the choke coil 58, the microcomputer 61 and the ASIC 62).

The motor lines 14, 44 connect the winding 13 and the substrate 41.

The frame member 20 has the bearing holder 23, the motor line takeout part 24, and the partition wall 31. The bearing holder 23 holds the bearing 167, which supports the shaft 16 in a rotatable manner. The motor lines 14, 44 are taken out from the motor line takeout part 24 toward the control unit 40 side. The frame member 20 receives heat from at least a part of the electronic components that are surface-mounted on the first surface 42 of the substrate 41, which is a motor facing surface of the substrate 41. That is, the electronic components on the first surface 42 are arranged to be heat-dissipatable to the frame member 20 from their backs, when the substrate 41 is disposed on one axial end of the drive device 1, which is an opposite end of the device 1 relative to the motor 10 side.

According to the present embodiment, the heat generation element 50 is disposed to dissipate heat to the frame member 20. That is, the frame member 20 serves as a heat sink as well as serving as an outer shell of the motor 10. Therefore, the number of the components in the drive device 1 is reduced, while reducing the volume of the device 1, especially along the axial direction of the device 1.

Further, in the configuration in which the control unit 40 is disposed on one end opposite to the output side of the motor 10 in one body with the motor 10, the shaft 16 and the control unit 40 are isolated or separated by the partition wall 31. Therefore, the rotation part of the motor 10 is not exposed to the control unit 40 side, which prevents foreign matter, which may have intruded into an inside of the motor case 11 from the output side, or may be produced by the rotation of the rotation part, along with grease used in the bearing 167, from intruding into the control unit 40.

The magnet 18 is disposed on the control unit side end 162 which is an end of the shaft 16 close to the control unit 40.

The rotational angle sensor 55 is mounted on the substrate 41 at a position that faces the magnet 18 across the partition wall 31.

The frame member 20 is made with the non-magnetic material.

By making the frame member 20 with the nonmagnetic material, the rotation angle of the motor 10 is appropriately detectable with the rotational angle sensor 55 even when the partition wall 31 interposes (i.e., separates) the magnet 18 and the rotational angle sensor 55.

The seal member 25 is provided on the motor line takeout part 24, which seals a gap between the motor line 14, 44 and the frame member 20. Thereby, water (e.g., water drop etc.,) intruding into the motor case 11 is prevented from further intruding into the control unit 40 via the motor line takeout part 24.

In the present embodiment, the cylinder part 116 and the frame member 20 are provided as separate bodies, thereby making it easier for the frame member 20 to be shaped or processed for ease of heat dissipation (i.e., which allows the heat generation element 50 to easily dissipate heat from the heat generation element 50).

The motor case 11 is electrically connected with the ground.

The electronic components mounted on the substrate 41 include the microcomputer 61. The microcomputer 61 has the malfunction detection part 615 that detects the intrusion of water in an inside of the motor case 11 based on the change of the resistance between the motor line 14, 44 and the motor case 11.

Thereby, the water intrusion in an inside of the motor case 11 is appropriately detectable.

The microcomputer 61 has the reporting part 616 that notifies the user of the intrusion of water in an inside of the motor case 11. Therefore, the abnormality of the drive device 1 is appropriately reported to the user, thereby enabling or facilitating a quick fix of the drive device 1 by the user at an early stage of the abnormality.

In the present embodiment, the malfunction detection part 615 of the microcomputer 61 may also be a "water intrusion detector", and the reporting part 616 may also be a "reporting part".

The drive device 1 is applied to the electric power steering apparatus 8. The electric power steering apparatus 8 is provided with the drive device 1 and the speed reduction gear 9, which transmits the torque outputted from the motor 10 to the column shaft 102. When the column shaft 102 is driven by the torque of the motor 10, the steering operation of the steering wheel 101 by the driver is assisted.

The drive device 1 has a waterproof structure by which permeation or intrusion of water (e.g., water drops) from the gap of the bearing 167 into the control unit 40 is prevented, even when water intrudes into the motor case 11 from the output side. Therefore, the drive device 1 is installed and used in the engine room suitably for the application to the rack assistant type electric power steering apparatus.

Second Embodiment

Figure 7:
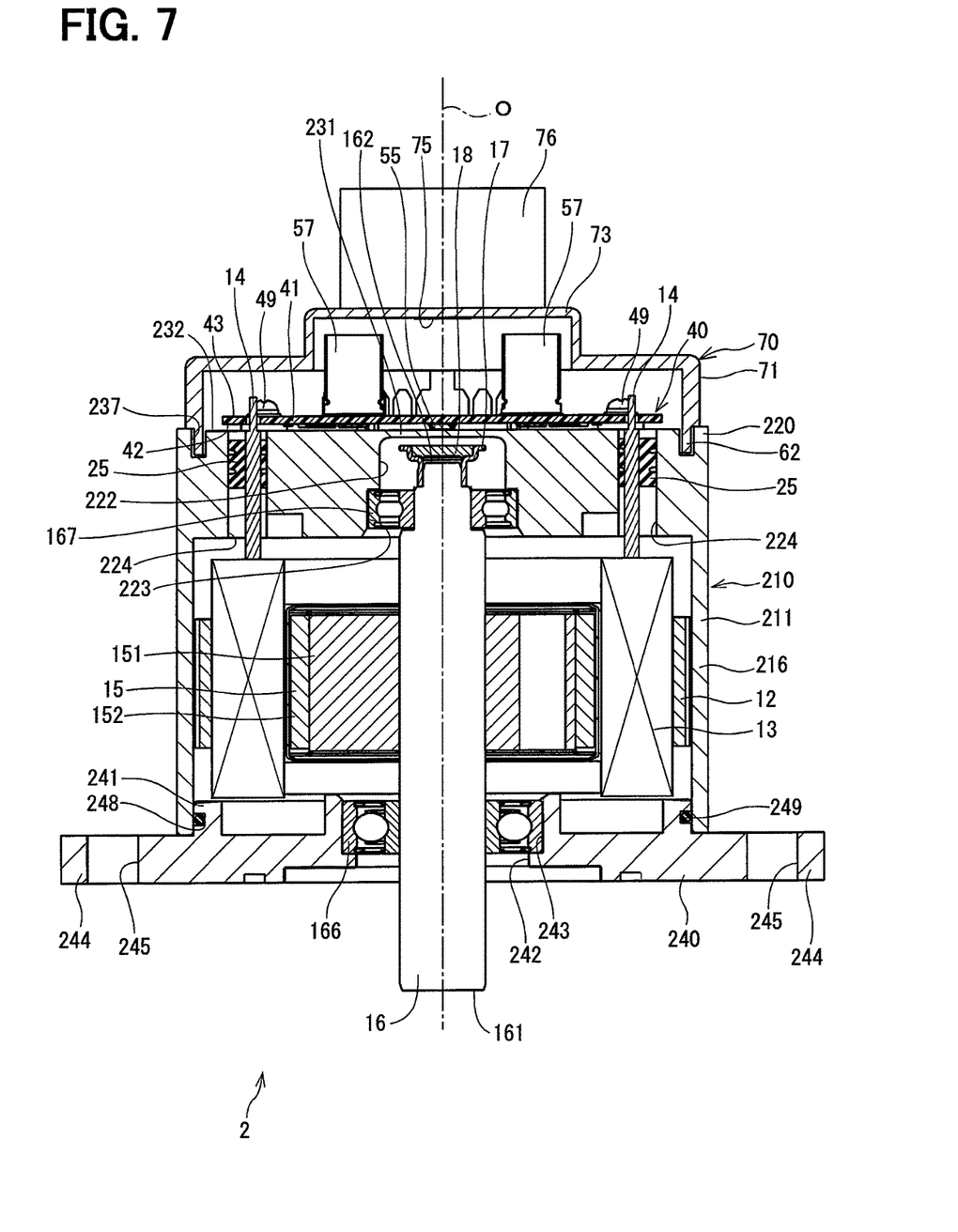
FIG. 7 is the sectional view of the drive device in a second embodiment of the present disclosure.

The drive device in the second embodiment of the present disclosure is described based on FIG. 7.

Figure 8:
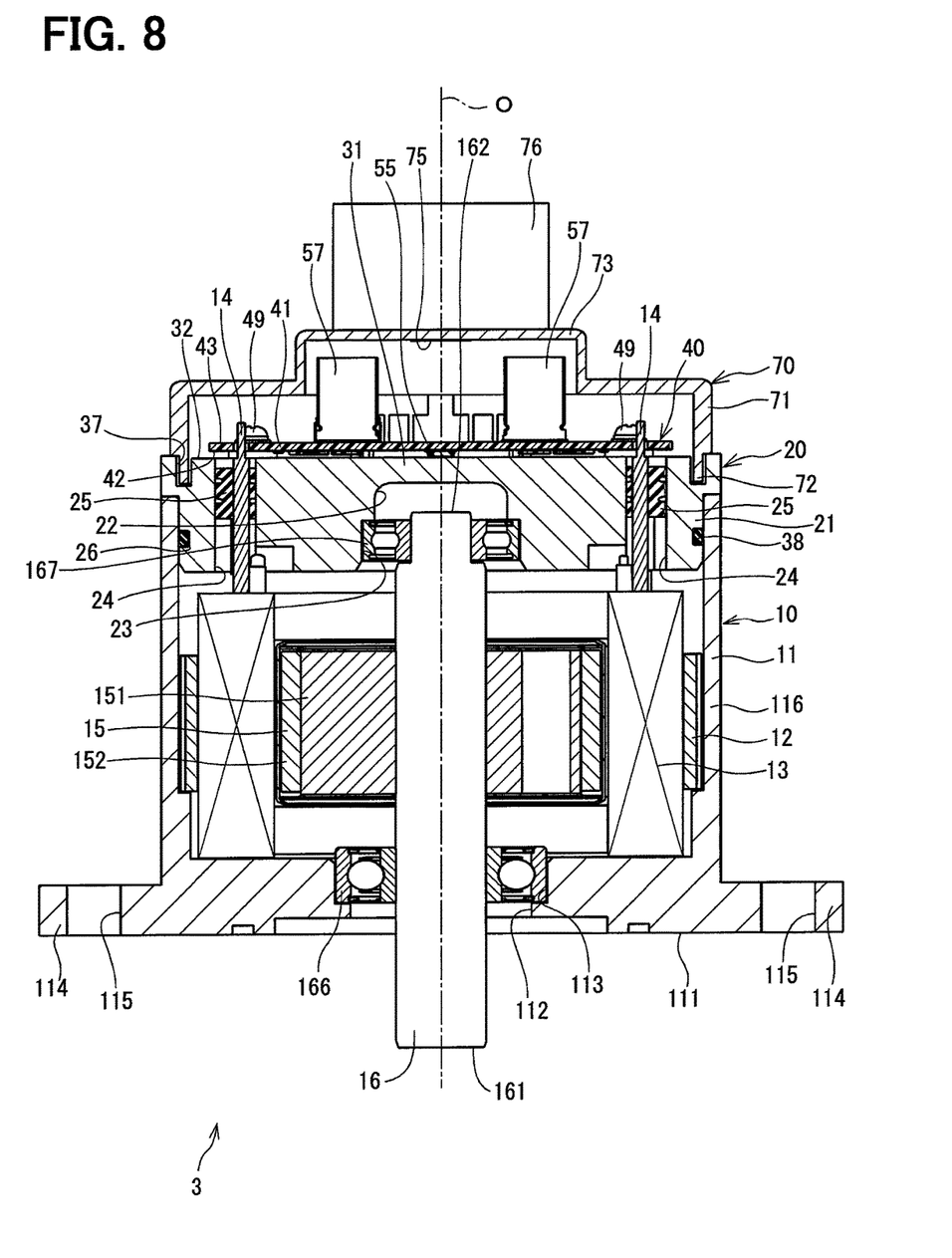
FIG. 8 is a cross-sectional view of the drive device in a third embodiment of the present disclosure.

FIGS. 7 and 8 described in the following correspond to FIG. 3 of the first embodiment.

As shown in FIG. 7, a drive device 2 is provided with a motor 210, a gear side frame 240, the control unit 40, and the cover member 70. The control unit 40, the cover member 70, and the circuit configuration are the same as the corresponding parts of the above-mentioned embodiment.

The motor 210 is an electric motor of three-phase electric machine provided with a motor case 211, the stator 12, the winding 13, the rotor 15, the shaft 16 and the like.

The motor case 211 has a cylinder part 216 and a bottom part 220 serving as a partition member, is formed in the shape of a cylinder like object with bottom, and is electrically connected with the ground terminal of the power supply connector 76 via the substrate 41. Just like the frame member 20 of the first embodiment, the motor case 211 is made with a material having good heat/electrical conductivity, and with no-magnetic characteristic. In the present embodiment, the motor case 211 is made with aluminum.

The motor case 211 has its bottom 220 positioned close to the control unit 40 (i.e., facing the control unit 40), and its opening facing away from the control unit 40 (i.e., positioned on the opposite side of the motor 210).

The fixing part (not illustrated) for fixing the gear side frame 240 projects (i.e., stands) from a periphery of an opening of the cylinder part 216, projecting outward along the radius direction, and the gear side frame 240 is fixed on the cylinder part 216 with a screw or the like.

An insertion room 222, which opens toward the output side, is formed at the axial center of the bottom part 220, and the control unit side end 162 and the magnet 18 of the shaft 16 are inserted into the insertion room 222. A wall of the insertion room 222 close to the control unit 40 functions as a partition wall 231, and the magnet 18 is positioned at a facing position of the control unit 40 across the partition wall 231. Further, at the axial center of the bottom part 220, a bearing holder 223 holding the bearing 167 is formed.

A motor line takeout part 224 is formed outside in the radius direction of the insertion room 222 on the bottom part 220. Two motor line takeout parts 224 are formed just like the above-mentioned embodiment, and the seal member 25 is provided in the two motor line takeout parts 224.

An adhesion groove 237, into which the insert portion 72 of the cover member 70 is inserted, is formed outside in the radius direction of the motor line takeout part 224 that is formed on the substrate fixing face 232, which a part of the motor case 211 facing the control unit 40.

Further, a fixing part on which a substrate lockscrew is screwed, a relay housing part, an ASIC housing part, and a terminal groove are respectively formed on the substrate fixing face 232.

The heat generation element 50 mounted on the first surface 42 of the substrate 41 is arranged to dissipate heat to the substrate fixing face 232.

The gear side frame 240 is made, for example, with metal (e.g., aluminum), and is fixed to the motor case 211 with a screw thread or the like. The gear side frame 240 has an insert portion 241. The insert portion 241 is inserted into an inside in the radius direction of the cylinder part 216 so that the opening of the motor case 211 is closed. A shaft hole 242 into which the output side end 161 of the shaft 16 is inserted is bored substantially at the center of the gear side frame 240. A bearing holder 243 holding the bearing 166 is formed on the gear side frame 240.

A fixing part 244 projects from (i.e., stands on) the periphery of the gear side frame 240 outwardly along the radius direction. A fixation hole 245 into which a fixation component (e.g., a screw thread) used for fixation of the gearbox (not illustrated) is inserted is formed on the fixing part 244.

An O ring groove 248 in which an O ring 249 is inserted is formed outside in the radius direction of the insert portion 241, and the O ring 249 is bindingly pressed by the groove 248 on the insert portion 241 and the cylinder part 216. Thereby, a seal between the motor case 211 and the gear side frame 240 is established, and permeation of water (e.g., water drops) through a gap between the motor case 211 and the gear side frame 240 is prevented.

According to the present embodiment, the bottom part 220, which functions as the cylinder part 216 and a partition member, is integrated to have one body. Such a configuration achieves the same effects as the previously-mentioned embodiment.

Further, since heat of the heat generation element 50 is dissipated to the bottom part 220 that is made in one body with the cylinder part 216, resistance to heat dissipation in such configuration is smaller than the one a cylinder-frame separate configuration in which the cylinder part 216 is provided as separate part from the frame part (i.e., the bottom part 220 in this case). A size of heat dissipation surface is increased, thereby achieving a more efficient heat dissipation.

By forming the cylinder part 216 and the bottom part 220 in one body, an impedance of a path from the cylinder part 216 to the ground line decreases, thereby reducing a common mode noise that leaks to an outside of the drive device 2.

Third Embodiment

The drive device in the third embodiment of the present disclosure is described based on FIG. 8.

The present embodiment is a modification of the first embodiment and, as for a drive device 3, a magnet is not provided on the control unit side end 162 of the shaft 16. Further, a rotational angle sensor is not provided at a facing part across the partition wall 31 from the magnet. That is, the rotation angle is detected by a method other than detecting a change of the magnetic field of the magnet.

In such a configuration, the frame member 20 may be made with a magnetic material such as iron, etc. (i.e., needs not be made with non-magnetic material).

Even in such configuration, the same effects as the above-mentioned embodiment are achieved.

Other Embodiments (a) Case Member

According to the above-mentioned embodiments, the cylinder part of the case member is electrically connected with the power supply ground via the substrate, the connector for the power supply, etc.

According to other embodiments, the cylinder part and the power supply ground of the motor case need not be electrically connected.

(b) Partition Member

According to the first embodiment, the frame member is fixed to motor case by the frame lockscrew.

According to other embodiments, any member other than the lockscrew may be used to fix the frame member. The number of fixing parts may be not only three but may be arbitrarily defined. The same applies to other fixation components.

Further, in other embodiments, the frame member may be fixed to the motor case by press-fitting. The press-fit of the frame member enables the reduction of the number of components in the drive device, and also enables the volume reduction especially along the radius direction.

According to the above-mentioned embodiments, two connection line takeout parts are formed on the partition member, and three connection lines are taken out from one connection line takeout part.

According to other embodiments, the number of the connection lines taken out from the connection line takeout part may not only be three but arbitrarily defined. That is, for example, the connection line takeout part may be provided for every connection line.

Further, in the above-mentioned embodiments, the seal member is provided in the motor line insertion hole.

According to other embodiments, the seal member may be omitted.

(c) Control Unit

According to the above-mentioned embodiments, the switching element, the current detection element, the power relay, the reverse connection protection relay, and the ASIC, which constitute an inverter, are heat generation elements, and are arranged to dissipate heat to the partition member.

According to other embodiments, electronic components (i.e., the switching element, the current detection element, the power relay, the reverse connection protection relay, and the microcomputers other than the ASIC) that constitute the inverter may be considered as the heat generation elements, and may be arranged to dissipate heat to the partition member.

Further, the switching element, the current detection element, the power relay, the reverse connection protection relay, and a part of ASIC constitute the inverter are not necessarily arranged to dissipate heat to the partition member.

According to the above-mentioned embodiments, the heater element is arranged to dissipate heat to the partition member via a heat dissipation gel.

According to other embodiments, the heat dissipation gel may be replaced with a heat dissipation sheet, or the heat dissipation gel may be omitted and the heat generation element may be arranged to directly contact the partition member to dissipate heat from the back of the heat generation element.

According to the above-mentioned embodiments, based on the terminal voltage, a change of the resistance between the motor line and the motor case is detected.

According to other embodiments, based on the detection values other than the terminal voltage (e.g., a bus voltage on a high potential side), a change of the resistance between the motor line and the motor case may be detected, and the intrusion of water into an inside of the case member may be detected based on the detection of the above-mentioned detection values, for example. Further, in other embodiments, water intrusion detection may not necessarily be performed.

According to the above-mentioned embodiments, the abnormality is reported to the driver by lighting the warning lamp.

According to other embodiments, the abnormality may be reported to the driver by any method (e.g., by voice, by image, or the like). Further, the reporting to the driver may not necessarily be performed.

According to the above-mentioned embodiments, the arithmetic circuit is provided by the microcomputer.

According to other embodiments, the arithmetic circuit is provided in different configuration (e.g., a circuit including an analog circuit or the like). Further, the water intrusion detector and the reporting part may be provided by a software process that is realized by executing a stored program by CPU, or may be provided to a hardware process by a dedicated electronic circuit.

(d) Cover Member

According to the above-mentioned embodiments, the connector is provided in one body with the cover member.

According to other embodiments, the connector and the cover member may have separate bodies.

According to the above-mentioned embodiments, the number of the connectors is three.

According to other embodiments, the number of connectors may be one, two, four or more.

According to the above-mentioned embodiments, the cover member is fixed to the partition member by adhesives.

According to other embodiments, the cover member may be fixed to the partition member by the screw thread, calking, etc.

(e) Drive Device

According to the above-mentioned embodiments, the rotating electric machine is a three-phase brushless motor.

According to other embodiments, the rotating electric machine may be any motor other than the three-phase brushless motor.

Further, the rotating electric machine may not necessarily be a motor (i.e., an electric motor), but may be a generator, or a motor-generator that has a motor function and a generator function. Further, the winding may be provided as one system instead of two systems, or may be provided as three or more systems. Further, depending on the number of systems, the number of inverters and relays may also be changed from the two to any number.

According to the above-mentioned embodiments, the drive device is applied to an electric power steering apparatus.

According to other embodiments, the drive device may be applied to the devices other than an electric power steering apparatus.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A drive device, comprising:
   a rotating electric machine including:
      a case member having a cylinder part;
      a stator housed in the cylinder part of the case member and having a winding wound on the stator;
      a rotor rotatably disposed relative to the stator; and
      a shaft rotatably disposed together with the rotor;
   a control unit having a substrate on which electronic components relevant to a drive control of the rotating electric machine are mounted, a position of the control unit relative to the rotating electric machine being on an opposite side to an output part of the rotating electric machine that outputs a rotation of the rotating electric machine;
   a connection line connecting the winding and the substrate; and
   a partition member disposed on an open end of the cylinder part of the case member, the partition member including:
      a bearing holder holding a bearing that rotatably bears the shaft;
      a connection line takeout part allowing the connection line to extend toward the control unit; and
      a partition wall separating the shaft and the control unit at a radial inside position relative to the connection line takeout part, wherein
   the substrate is disposed on and fixed directly to one face of the partition member that is opposite to the rotating electric machine, and wherein
   the partition member and the substrate are arranged so that heat of at least a part of the electronic components that are directly surface-mounted on one surface of the substrate that faces the rotating electric machine is dissipated to the partition member.

2. The drive device of claim 1, wherein
one end of the shaft close to the control unit has a magnet disposed on the one end,
the substrate has a rotation angle sensor at a position that faces the magnet across the partition wall, and
the partition member is made from a non-magnetic material.

3. The drive device of claim 1, wherein
the connection line takeout part has a seal member that seals a gap between the connection line and the partition member.

4. The drive device of claim 1, wherein
the cylinder part and the partition member have separate bodies.

5. The drive device of claim 1, wherein
the cylinder part and the partition member are integrated to have one body.

6. The drive device of claim 1, wherein
the case member is electrically connected to a ground,
the electronic component includes an arithmetic circuit that has a water intrusion detector for detecting an intrusion of water into an inside of the case member based on a change of resistance between the connection line and the case member.

7. The drive device of claim 6, wherein
the computation circuit includes a reporting part for reporting the intrusion of water into the inside of the case member.

8. An electric power steering apparatus comprising:
a drive device of claim 1; and
a gear that transmits an output torque of the rotating electric machine to a drive object, wherein
the electric power steering apparatus assists a steering operation of a driver for steering a steering member through driving the drive object with the output torque of the rotating electric machine.

9. The drive device of claim 1, wherein
the partition member is formed as a unitary one-piece member, within which the bearing holder, the connection line takeout part and the partition wall are integrally formed.

10. The drive device of claim 1, wherein
the bearing holder comprises a cavity with an opening for receiving the bearing, wherein the opening opens in a direction facing the rotor.

11. The drive device of claim 1, wherein
the stator is enclosed within the cylinder part of the case member.

12. The drive device of claim 1, wherein a thickness of the partition member at the partition wall is thinner in an axial direction than a thickness of the partition member at portions radially outward of the partition wall.

* * * * *